United States Patent
Kan et al.

(10) Patent No.: US 9,524,058 B2
(45) Date of Patent: Dec. 20, 2016

(54) CALIBRATION METHOD

(71) Applicant: Wistron Corporation, New Taipei (TW)

(72) Inventors: Wei-Kuo Kan, New Taipei (TW); Yen-Ting Lin, New Taipei (TW); Yu-Yen Chen, New Taipei (TW); Po-Liang Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/225,844

(22) Filed: Aug. 2, 2016

(65) Prior Publication Data

US 2016/0342281 A1 Nov. 24, 2016

Related U.S. Application Data

(62) Division of application No. 14/220,148, filed on Mar. 20, 2014, now Pat. No. 9,436,316.

(30) Foreign Application Priority Data

Dec. 2, 2013 (TW) .............................. 102144097 A

(51) Int. Cl.
| | |
|---|---|
| *G01S 7/41* | (2006.01) |
| *G06F 3/041* | (2006.01) |
| *G01B 11/00* | (2006.01) |
| *G06F 3/042* | (2006.01) |

(52) U.S. Cl.
CPC ............. *G06F 3/0418* (2013.01); *G01B 11/00* (2013.01); *G06F 3/0421* (2013.01)

(58) Field of Classification Search
CPC ....... G06F 3/0418; G06F 3/0428; G01B 11/00
USPC ...................................................... 250/208.1
See application file for complete search history.

(56) References Cited

U.S. PATENT DOCUMENTS

| | | | | |
|---|---|---|---|---|
| 5,383,018 A * | 1/1995 | Sadjadi | ................... | H01L 22/34 356/237.5 |
| 6,384,408 B1 * | 5/2002 | Yee | ......................... | G01J 5/041 250/221 |
| 7,224,450 B2 * | 5/2007 | Sezginer | .............. | G01N 21/274 356/244 |
| 8,406,918 B2 * | 3/2013 | Tan | ........................ | G11B 5/851 700/218 |

* cited by examiner

*Primary Examiner* — Seung C Sohn
(74) *Attorney, Agent, or Firm* — Jiang Chyun IP Office

(57) ABSTRACT

A calibration method suitable for calibrating a light transceiver module includes: disposing a plurality of reflective regions, a plurality of light-absorbing regions and a feature region beside the light transceiver module; making the light transceiver module emit light toward the reflective regions, the light-absorbing regions and the feature region and sensing the images of the reflective regions, the light-absorbing regions and the feature region; comparing the actual orientations of the reflective regions, the light-absorbing regions and the feature region with the positions of the images formed by the reflective regions, the light-absorbing regions and the feature region on an image sensing surface of the light transceiver module so as to calibrate the actual orientations corresponding to the positions on the image sensing surface.

13 Claims, 6 Drawing Sheets

CALIBRATION METHOD

CROSS-REFERENCE TO RELATED APPLICATION

This application is a divisional application of and claims the priority benefit of U.S. application Ser. No. 14/220,148, filed on Mar. 20, 2014. The prior application Ser. No. 14/220,148 claims the priority benefit of Taiwan application serial no. 102144097, filed on Dec. 2, 2013. The entirety of each of the above-mentioned patent applications is hereby incorporated by reference herein and made a part of this specification.

BACKGROUND OF THE DISCLOSURE

Field of the Disclosure

The disclosure generally relates to a calibration method.

Description of Related Art

With the advancement of science and technology, the operation of electronic devices has not been limited to using the mouse or the pressing button, instead, it can use more intuitive and more humanized touch way.

The touch technology can be divided into capacitive touch technique, resistive touch technique, optical touch technique, and so on, wherein although the capacitive touch technique can achieve precise multi-point-touch, but it is not suitable for large size screen. This is because when the size of a capacitive touch panel was made bigger and bigger, not only the cost thereof gets more expensive, but also the resistance-capacitance delay (RC delay) appears more serious.

By comparison, for the common optical touch technique, the touch detection is realized by disposing a light source and an image-capturing component at the corners of a screen. As a result, the product cost and the detection effect are not affected by the screen size, so that the optical touch technique is still quite suitable for the large size screen.

In a typical optical touch technique, three factors that the assembling position error of the light source and the image-capturing component, the lens aberrations in the image-capturing component and the position error of assembling the lenses would affect the accuracy for determining the touching position. Thus, for the optical touch technique, how to calibrate the light source and the image-capturing component is an important issue.

SUMMARY OF THE DISCLOSURE

Accordingly, the disclosure is directed to a jig, which can effectively calibrate a light transceiver module.

The disclosure is also directed to a calibration method, which can effectively calibrate a light transceiver module.

A jig provided by an embodiment of the disclosure is configured to calibrate a light transceiver module. The jig includes a disposition region for the light transceiver module and an arc structure, in which the light transceiver module is suitable to be disposed on the disposition region for the light transceiver module, and the arc structure takes the position of the disposition region for the light transceiver module as a circle center thereof and includes a plurality of reflective regions, a plurality of light-absorbing regions and a feature region. The reflective regions and the light-absorbing regions are alternately arranged, and the feature region is a region for reflection or a region for absorbing light, in which when the feature region is the region for reflection, the width of the region for reflection is different from the width of each of the reflective regions, and when the feature region is the region for absorbing light, the width of the region for absorbing light is different from the width of each of the light-absorbing regions.

A calibration method provided by an embodiment of the disclosure is suitable for calibrating a light transceiver module and includes: disposing a plurality of reflective regions, a plurality of light-absorbing regions and a feature region beside the light transceiver module, in which the reflective regions and the light-absorbing regions are alternately arranged, the feature region is a region for reflection or a region for absorbing light, when the feature region is the region for reflection, the width of the region for reflection is different from the width of each of the reflective regions, and when the feature region is the region for absorbing light, the width of the region for absorbing light is different from the width of each of the light-absorbing regions; making the light transceiver module emit light toward the reflective regions, the light-absorbing regions and the feature region and sensing the images of the reflective regions, the light-absorbing regions and the feature region; comparing the actual orientations of the reflective regions, the light-absorbing regions and the feature region with the positions of the images formed by the reflective regions, the light-absorbing regions and the feature region on an image sensing surface of the light transceiver module so as to calibrate the actual orientations corresponding to the positions on the image sensing surface.

With the jig and the calibration method provided by the embodiments of the disclosure, since the reflective regions, the light-absorbing regions and the feature region are adopted to represent the actual angles, so that when the light transceiver module captures the images of the reflective regions, the light-absorbing regions and the feature region, the light transceiver module can be calibrated by comparing the actual angles with the imaging positions of the captured images of the reflective regions, the light-absorbing regions and the feature region on the image sensing surface of the light transceiver module. As a result, the assembling error of the light transceiver module can be effectively calibrated.

In order to make the features and advantages of the disclosure more comprehensible, the disclosure is further described in detail in the following with reference to the embodiments and the accompanying drawings.

DESCRIPTION OF THE EMBODIMENTS

Figure 1A:
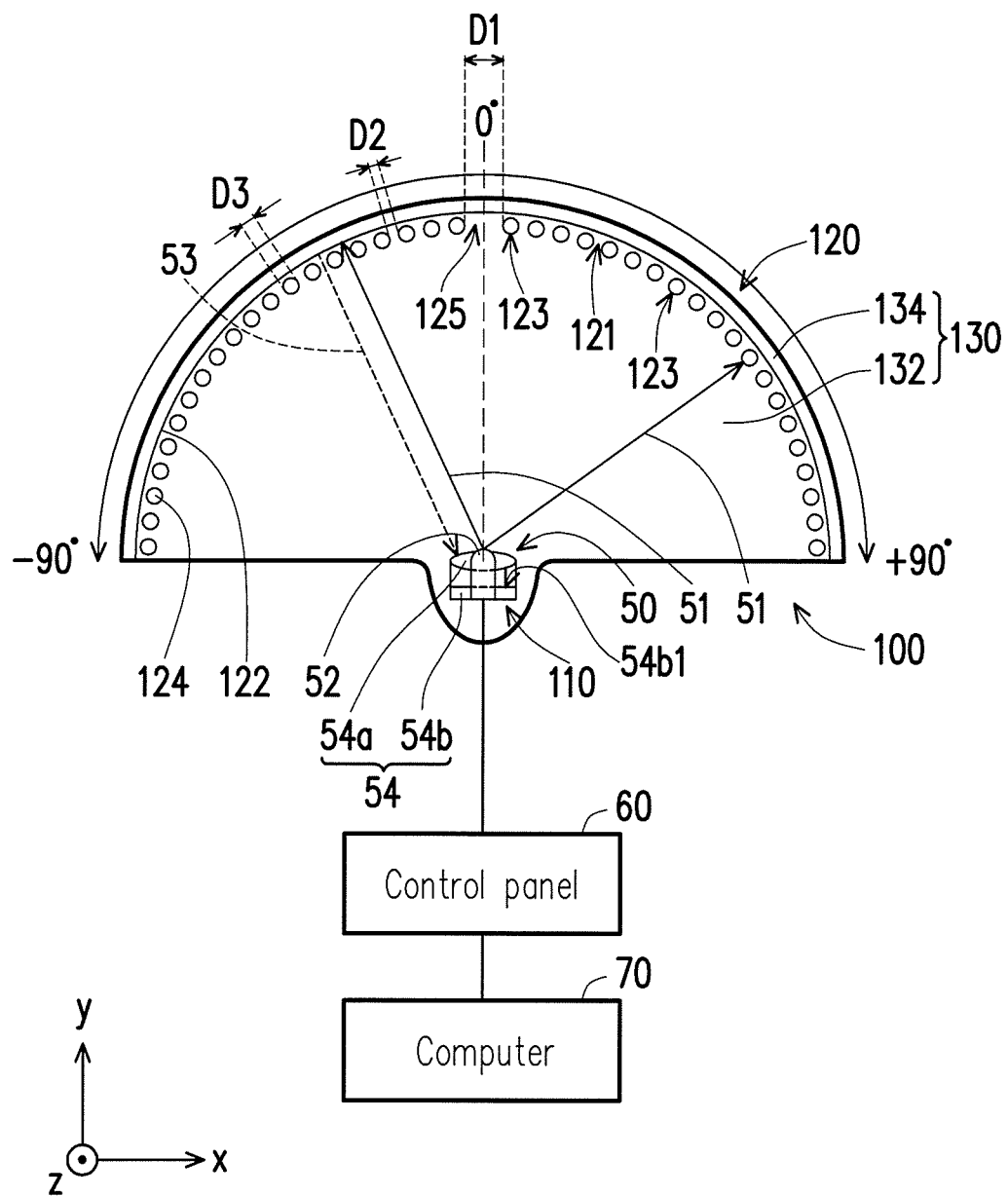
FIG. 1A is a top-view diagram of a jig in an embodiment of the disclosure.
Figure 1B:
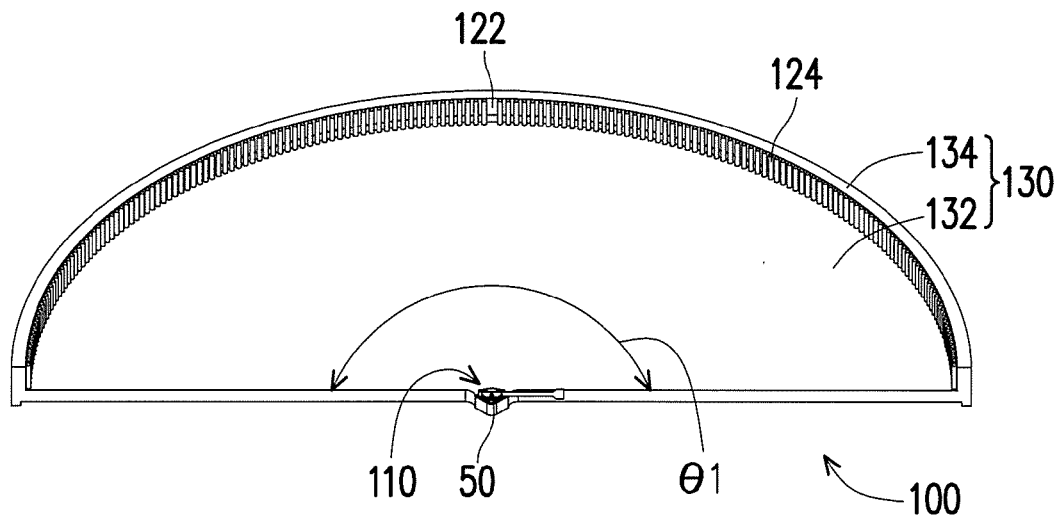
FIG. 1B is a three-dimensional diagram of the jig in FIG. 1A.
Figure 1C:
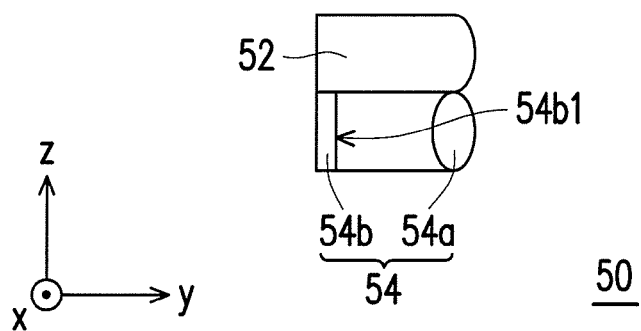
FIG. 1C is a side-view diagram of the light transceiver module of FIG. 1A.
Figure 2:
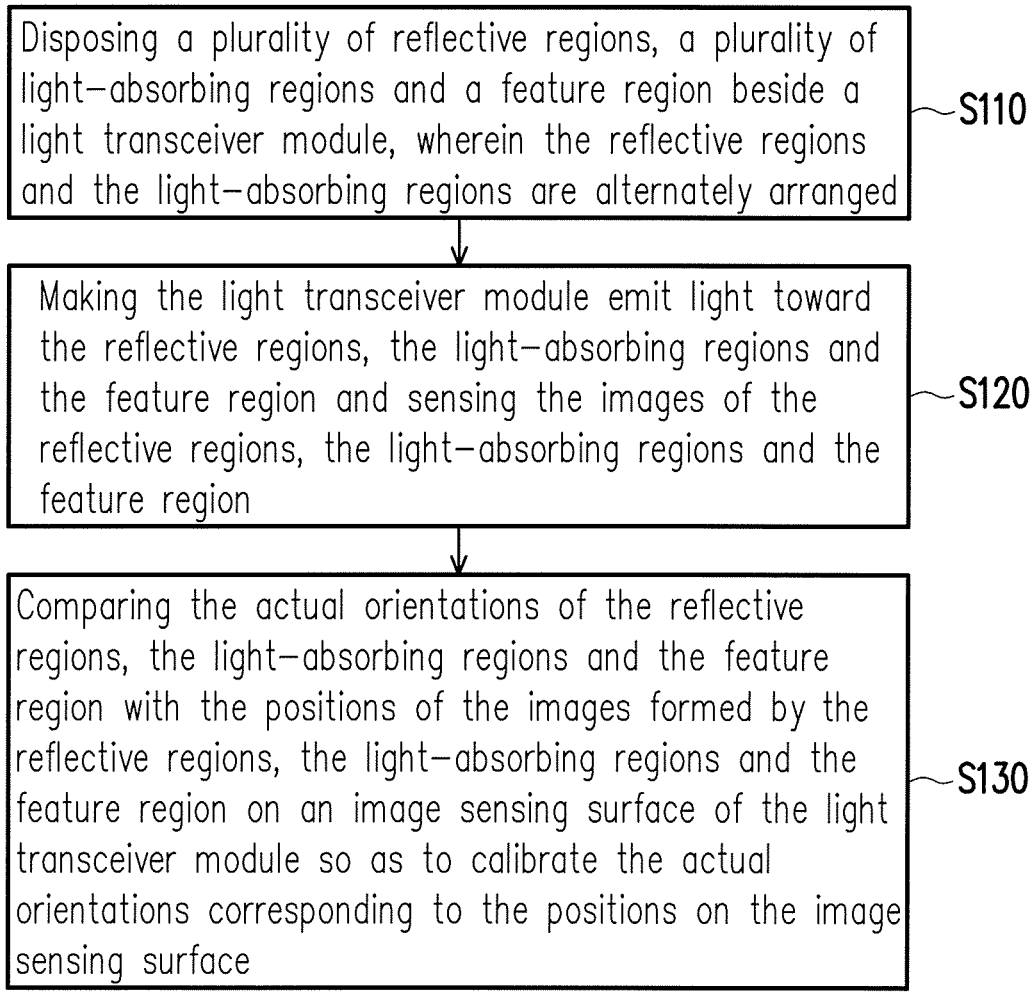
FIG. 2 is a flowchart showing a calibration method in an embodiment of the disclosure.

FIG. 1A is a top-view diagram of a jig in an embodiment of the disclosure, FIG. 1B is a three-dimensional diagram of the jig in FIG. 1A, FIG. 1C is a side-view diagram of the light transceiver module of FIG. 1A and FIG. 2 is a flowchart showing a calibration method in an embodiment of the disclosure. Referring to FIGS. 1A, 1B and 2, the calibration method of the embodiment is used to calibrate a light transceiver module 50 through the jig 100 of FIG. 1A. The light transceiver module 50 includes at least one light-emitting component 52 and an image-capturing component 54. In the embodiment, the light-emitting device 52 is a light emitting diode (LED), for example, an infrared LED. In addition, the image-capturing component 54 includes a lens 54a and a image sensor 54b disposed at a side of the lens 54a, in which the image sensor 54b is, for example, a line sensor or a two-dimensional sensor. In the embodiment, the image sensor 54b is a charge coupled device (CCD) or a complementary metal oxide semiconductor sensor (CMOS sensor). In the embodiment, the y-direction marked in FIGS. 1A and 1B can be defined as the optical axis direction of the light transceiver module 50, the x-direction can be defined as the arrangement direction of the pixels of the image sensor 54b (for example, a line sensor) and the z-direction can be defined as the stacking direction of the image-capturing component 54 and the light-emitting device 52 (as shown by FIG. 1C), and the x-direction, the y-direction and the z-direction are perpendicular to each other, which the disclosure is not limited to.

The calibration method of the embodiment includes following steps. First, in step S110, a plurality of reflective regions 121, a plurality of light-absorbing regions 123 and a feature region 125 are disposed beside the light transceiver module 50, in which the reflective regions 121 and the light-absorbing regions 123 are alternately arranged, the feature region 125 is a region for reflection or a region for absorbing light. In the embodiment, the feature region 125 is the region for reflection, at the time, the width D1 of the feature region 125 is different from the width D2 of each of the reflective regions 121. In another embodiment, the feature region 125 is the region for absorbing light, at the time, the width of the region for absorbing light is different from the width D3 of each of the light-absorbing regions 123.

In the embodiment, step S110 can be executed with the jig 100 of FIG. 1A. In the embodiment, the jig 100 is used for calibrating the light transceiver module 50, and the jig 100 includes a disposition region for the light transceiver module 110 and an arc structure 120. The light transceiver module 50 is suitable to be disposed on the disposition region for the light transceiver module 110, and the arc structure 120 takes the position of the disposition region for the light transceiver module 110 as the circle center thereof. The arc structure 120 includes the aforementioned reflective regions 121, light-absorbing regions 123 and feature region 125. In other words, in step S110 of the embodiment, the light transceiver module 50 is disposed on the disposition region for the light transceiver module 110.

The jig 100 of the embodiment includes a carrying plate 130 having a lower plate 132 and an arc side plate 134 connected to the edge of the lower plate 132. In the embodiment, the disposition region for the light transceiver module 110 has a recess to accommodate the light transceiver module 50, and the light transceiver module 50 leans on the side wall of the recess for positioning. The arc structure of the embodiment includes an arc reflective unit 122 and a plurality of light-absorbing units 124. The arc reflective unit 122 takes the position of the disposition region for the light transceiver module 110 as the circle center thereof and continuously extends. The light-absorbing units 124 herein are arranged in arc shape beside the arc reflective unit 122 and located between the arc reflective unit 122 and the disposition region for the light transceiver module 110. The arc reflective unit 122 of the embodiment can be disposed on the arc side plate 134, for example, adhered onto the arc side plate 134. The light-absorbing units 124 respectively form the light-absorbing regions 123, and the portions of the arc reflective unit 122 exposed by the intervals (i.e., corresponding to the widths D2 and D1) between all two adjacent light-absorbing units 124 form the reflective regions 121 and the feature region 125. The reflective regions in the embodiment are retroreflection regions, for example, the arc reflective unit 122 is a retroreflector sheet, and the light-absorbing units 124 are, for example, light-absorbing pillars inserted on the lower plate 132.

The widths D2 of the reflective regions 121 in the embodiment are substantially the same as each other, and the widths D3 of the light-absorbing regions 123 are substantially the same as each other as well. In addition, in the embodiment, except that the two light-absorbing units 124 adjacent to the feature region 125 are separated by a first interval (i.e., the width D1), the other light-absorbing units 124 are equidistantly arranged respectively by a second interval (i.e., the width D2).

Figure 3A:
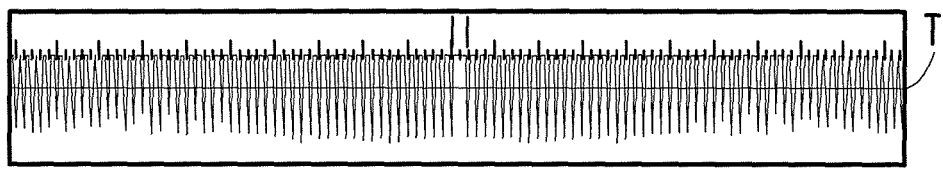
FIG. 3A is a distribution curve graph showing the light intensities of the images detected by the light transceiver module vs. the positions on the image sensing surface thereof under the layout of FIG. 1A.
Figure 3B:
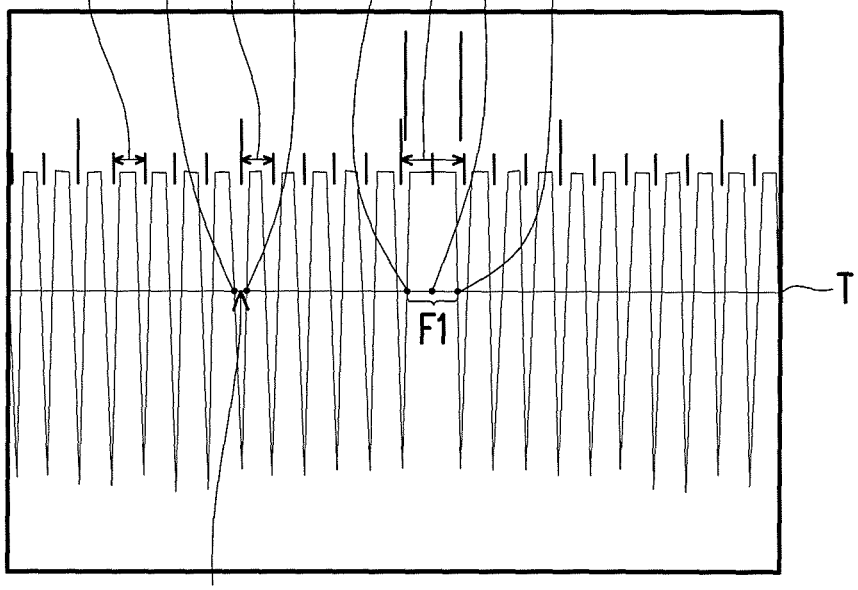
FIG. 3B is a partial enlarged diagram of the distribution curve graph of FIG. 3A.

Next going to step S120, the light transceiver module 50 emits light 51 toward the reflective regions 121, the light-absorbing regions 123 and the feature region 125 and senses the images of the reflective regions 121, the light-absorbing regions 123 and the feature region 125. FIG. 3A is a distribution curve graph showing the light intensities of the images detected by the light transceiver module vs. the positions on the image sensing surface thereof under the layout of FIG. 1A and FIG. 3B is a partial enlarged diagram of the distribution curve graph of FIG. 3A. Referring to FIGS. 1A, 2, 3A and 3B, in step S120, the light transceiver module 50 is electrically connected to a control panel 60 and the control panel 60 is electrically connected to a computer 70. Then, the user may use the computer 70 to give a command to the control panel 60 so that the control panel 60 asks the light transceiver module 50 to emit the light 51. A part of the light 51 is absorbed by the light-absorbing regions 123, while the other part of the light 51 is reflected by the reflective regions 121 and the feature region 125 to become reflective light 53 to be transmitted back to the light transceiver module 50. When the arc reflective unit 122 is a retroreflection sheet, the reflective light 53 is reversely transmitted to the light transceiver module 50 along a transmission path substantially the same as the transmission path of the light 51. Thereafter, the reflective light 53 passes through the lens 54a to arrive at the image sensor 54b. In addition, the user can use the computer 70 to send a command to the control panel 60 so that the control panel 60 asks the image sensor 54b to detect the reflective light 53. In the embodiment, the light-absorbing regions 123, the reflective regions 121 and the feature region 125 are, through the lens 54a, imaged on an image sensing surface 54b1 of the image sensor 54b. Thus, after the image sensor 54b senses the images, a sensed signal is delivered to the computer 70 through the control panel 60, as shown by FIGS. 3A and 3B.

Then in step S130, the actual orientations of the reflective regions 121, the light-absorbing regions 123 and the feature region 125 are compared with the positions (i.e., the abscissa positions) of the images formed by the reflective regions 121, the light-absorbing regions 123 and the feature region 125 on the image sensing surface 54b1 of the light transceiver module 50 so as to calibrate the actual orientations corresponding to the aforementioned positions on the image sensing surface 54b1 (the orientation angles marked in FIG. 1A, wherein only three orientation angles of three orientation angles of 0°, 90° and −90° are schematically given).

In the embodiment, step S130 includes recognizing a feature image portion F1 of the image formed on the image sensing surface 54b 1 corresponding to the feature region 125, and step S130 also includes recognizing a plurality of light-absorbing image portions F2 of the image formed on the image sensing surface 54b1 corresponding to the light-absorbing regions 123. The step of recognizing the feature image portion F1 of the image formed on the image sensing surface 54b 1 corresponding to the feature region 125 in the embodiment includes following steps. First, it is calculated a plurality of image intervals G2 of the light-absorbing image portions F2 in the images corresponding to the light-absorbing regions 123. For example, the user uses the computer 70 to select a threshold T on the abscissa in the signal of FIG. 3B, and then, two points B3 and B4 are calculated out wherein the points B3 and B4 are intersected points of a horizontal line with an ordinate value equal to the threshold T and the blocked signals (the recessed portions of the signal) in the signal of FIG. 3B. The portion between the points B3 and B4 can be defined as the light-absorbing image portions F2. Next, both the middle point of the points B3 and B4 of every blocking signal and the intervals of the middle points (i.e., the image intervals G2) are calculated out, followed by calculating the average value of the image intervals G2. Then, the portion of the image (i.e., the portion between the points B1 and B2 in FIG. 3B) corresponding to the image interval G2 greater than the average value (i.e., the image interval G2 located at the center of FIG. 3B) is taken as the feature image portion F1.

In addition, step S130 further includes mapping the position on the image sensing surface 54b1 of a first specific point (i.e., the middle point M1 between the points B1 and B2) in the feature image portion F1 to an actual reference angle corresponding to the feature region 125. For example, the position on the image sensing surface 54b1 of the first specific point is the position of a specific pixel on the image sensing surface 54b1, the actual reference angle corresponding to the feature region 125 is, for example, set as angle 0°, and the direction of the angle 0° is, for example, substantially the same as the optical axis direction of the light transceiver module 50. The pixels on the image sensing surface 54b1 can be sequentially ascending numbered along the x direction in FIG. 1A. In step S130, it can be known what number of the pixels corresponds to the direction of angle 0°.

Moreover, step S130 further includes mapping the positions on the image sensing surface 54b 1 of a plurality of second specific points (for example, the middle point between the points B3 and B4) in the light-absorbing image portions F2 respectively to a plurality of first actual angles respectively corresponding to the light-absorbing regions 123. In the embodiment, after finishing the fabrication or assembling of the jig 100, the orientation angles of the feature region 125 and the light-absorbing regions 123 are certain, so that as sequentially mapping the pixels of the aforementioned numbers at which the second specific points at both sides of the first specific point are located at to the light-absorbing regions 123 at both sides of the feature region 125, it can be known these light-absorbing regions 123 are sequentially corresponding to what number of the pixels. For example, assuming there is one light-absorbing region 123 disposed at each degree of the orientation angles except the angle 0°, the aforementioned step can decide every degree of the orientation angles is corresponding to what number of the pixels.

At the time, although the mapping relation between every degree of the orientation angles and a certain number of the pixels is aware of, but it does not mean it is known that the mapping relation between all numbers of the pixels and the corresponding orientation angles. Therefore, the calibration method in the embodiment further includes using the interpolation approach to calculate out a plurality of second actual angles corresponding to the rest positions on the image sensing surface 54b 1 (for example, the positions of the pixels with other numbers) according to the mapping relation between the position of the aforementioned first specific point on the image sensing surface 54b1 and the actual angle (in following, referred as 'first mapping relation') and the mapping relation between the positions of the aforementioned second specific points on the image sensing surface 54b1 and the first actual angles (in following, referred as 'second mapping relation'). The second actual angles herein are interlaced between the first actual angles. For example, the linear interpolation can be used to calculate out the mapping relation between the pixels of all the rest numbers located between the pixels of the numbers with the known corresponding orientation angles and the angles with decimals located between every two adjacent orientation angles with integral degrees.

In the embodiment, step S130 further includes storing the first mapping relation and the second mapping relation in the control panel 60 and also storing the other mapping relation between the rest positions on the image sensing surface 54b 1 obtained through the interpolation (for example, the positions of the pixels with other numbers) and the corresponding the second actual angles in the control panel 60, where these mapping relations are in lookup table (LUT) way stored in the non-volatile memory of the control panel 60 such as in the flash memory. The step can be executed by using the computer 70. In this way, when the light transceiver module 50 detects a blocked signal at a pixel in future usage, the control panel 60 can find out an orientation angle corresponding to the blocked signal through the LUT.

All the aforementioned steps are finished prior to assembling the light transceiver module 50 at the optical touch device and thus are referred as offline calibration. At the time, although the parameters of the light transceiver module 50 itself have been calibrated, but the position error of the light transceiver module 50 on the optical touch device is not calibrated yet.

Figure 4:
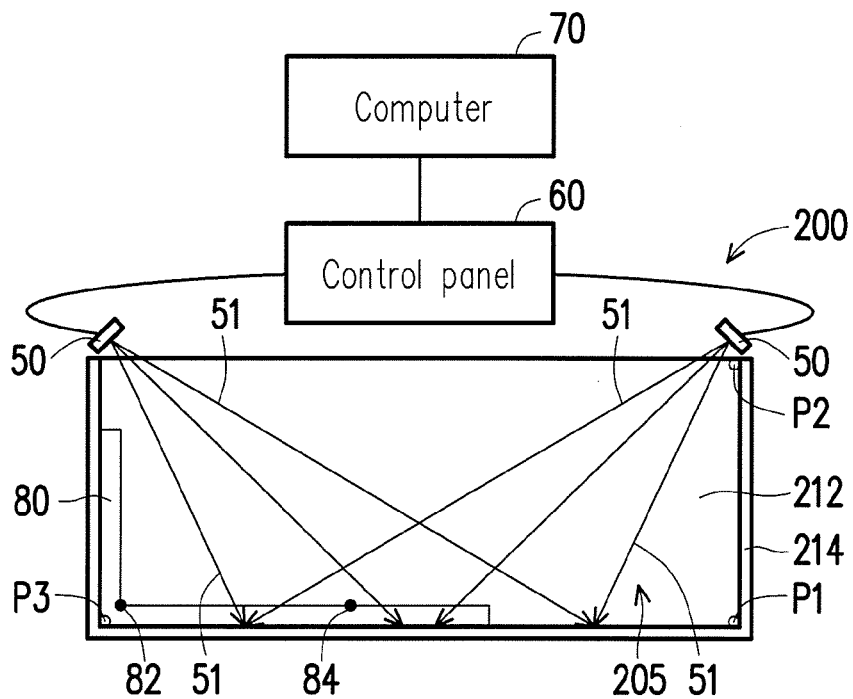
FIG. 4 is a schematic diagram showing the following calibration steps after assembling the light transceiver module calibrated by the jig in FIG. 1A to an optical touch device.

FIG. 4 is a schematic diagram showing the following calibration steps after assembling the light transceiver module calibrated by the jig in FIG. 1A to an optical touch device. Referring to FIGS. 1A and 4, at least one light transceiver module 50 can, after calibration by using the jig 100 of FIG. 1A, be disposed in the optical touch device 200 for an online calibration. In the embodiment, the optical touch device 200 includes a transparent protection plate 212 for protecting the screen, a reflective bar 214 disposed on the three edges of the transparent protection plate 212 (for example, a retroreflection bar), two light transceiver modules 50 respectively disposed at two corners of the transparent protection plate 212 and a control panel 60. The light transceiver modules 50 emit light towards the front space of the transparent protection plate 212 and sense the directions of the images at the front space of the transparent protection plate 212. In other embodiments however, the transparent protection plate 212 can be omitted, but the optical touch device 200 is directly disposed around the screen or other touch surfaces.

In more details, the calibration method of the embodiment further includes following steps. After step S130 of FIG. 2, the light transceiver module 50 is disposed beside a touch surface 205 (such as the surface of the transparent protection plate 212, the surface of a screen or other touch surfaces). Next, the light transceiver module 50 is used to detect the light-absorbing points 82 and 84 or the light-absorbing points P1, P2 and P3) of multiple known positions on the touch surface 205. Then, the known positions of the light-absorbing points are compared with the imaging positions of the light-absorbing points on the image sensing surface 54b1 of the light transceiver module 50 so as to calibrate the relationship between the light transceiver module 50 and the touch surface 205. The aforementioned light-absorbing points are, for example, the light-absorbing points 82 and 84 on a jig 80. The jig 80 can lean on the reflective bar 214 so that the position of the jig 80 is fixed and the positions of the light-absorbing points 82 and 84 would be known. Alternatively, these light-absorbing points are sequentially formed by an object to sequentially touch the touch surface 205. When the touch surface 205 has a larger size, the light-absorbing points P1, P2 and P3 can be implemented by using the finger to click the corners of the touch surface 205.

In the jig 100 and the calibration method of the embodiment, since the reflective regions 121, the light-absorbing regions 123 and the feature region 125 are used to represent the actual angles, so that when the light transceiver module 50 captures the images of the reflective regions 121, the light-absorbing regions 123 and the feature region 125, the light transceiver module 50 can be calibrated through comparing the actual angles with the imaging positions of the captured images of the reflective regions 121, the light-absorbing regions 123 and the feature region 125 on the image sensing surface 54b1 of the light transceiver module 50. In this way, the assembling error of the light transceiver module 50 can be effectively calibrated and the touch points of the optical touch device 200 can be determined more precisely. In addition, in the calibration method of the embodiment, since the jig 100 can be used to perform offline calibration on the light transceiver module 50 so as to avoid that the calibration is done only after assembling the light transceiver module 50 at the optical touch device 200, which may lead to a calibration failure due to the problem of the light transceiver module 50 itself and cause re-working problem (such as returning for re-assembling a good light transceiver module). In short, the calibration method of the embodiment can reduce the process time and thus advance the production yield. Moreover, the light transceiver module 50 calibrated by the jig 100 can be suitable for the optical touch device 200 in various sizes, which has dimension share capability so as to lowdown the development cost of the optical touch device 200.

Figure 5:
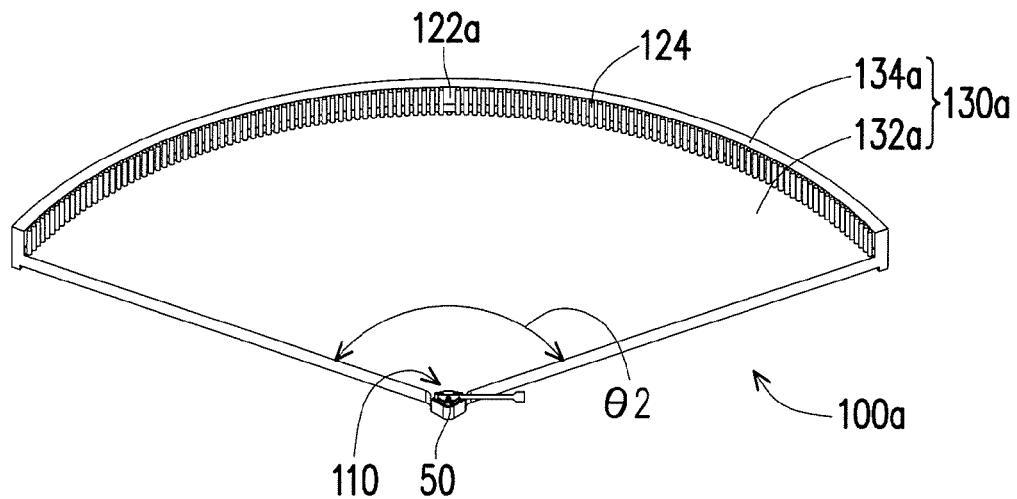
FIG. 5 is a three-dimensional diagram of a jig according to another embodiment of the disclosure.

FIG. 5 is a three-dimensional diagram of a jig according to another embodiment of the disclosure. Referring to FIG. 5, the jig 100a of the embodiment is similar to the jig 100 of FIG. 1B except that the expanding angle θ1 of the lower plate 132, the arc side plate 134 and the arc reflective unit 122 in the jig 100 of FIG. 1B is 180°, while the expanding angle θ2 of the lower plate 132a and the arc side plate 134a of the carrying plate 130a and the arc reflective unit 122a in the jig 100a of FIG. 5 is less than 180°. The value of the expanding angle θ2 can be decided by the real application requirement, for example, decided by the field of view (FOV) of the light transceiver module 50. The jig 100a of the embodiment can be also applied in the calibration method of FIG. 2.

Figure 6:
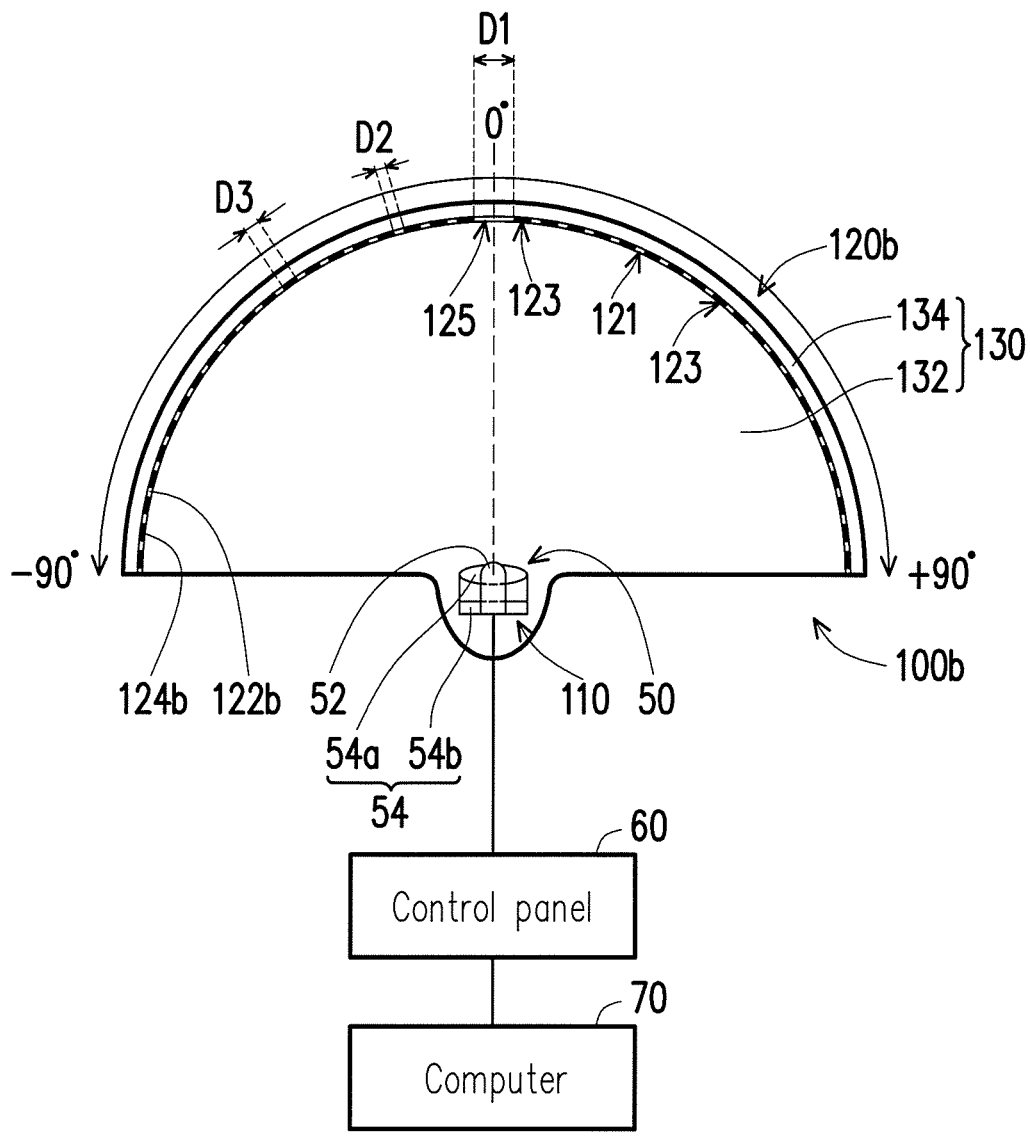
FIG. 6 is a three-dimensional diagram of a jig according to yet another embodiment of the disclosure.

FIG. 6 is a three-dimensional diagram of a jig according to yet another embodiment of the disclosure. Referring to FIG. 6, the jig 100b of the embodiment is similar to the jig 100 of FIG. 1A except that in the arc structure 120b of the embodiment, the light-absorbing regions 123 are respectively formed by a plurality of light-absorbing units 124b, and the feature region 125 and the reflective regions 121 are formed by multiple arc reflective units 122b. The light-absorbing units 124b and the arc reflective unit 122b are alternately connected to form an optical film disposed on the arc side plate 134.

In summary, in the jig and the calibration method provided by the embodiments of the disclosure, since the reflective regions, the light-absorbing regions and the feature region are adopted to represent the actual angles, so that when the light transceiver module captures the images of the reflective regions, the light-absorbing regions and the feature region, the light transceiver module can be calibrated by comparing the actual angles with the imaging positions of the captured images of the reflective regions, the light-absorbing regions and the feature region on the image sensing surface of the light transceiver module. As a result, the assembling error of the light transceiver module can be effectively calibrated.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. In view of the foregoing, the protective scope of the disclosure is given by the following claims and their equivalents.

What is claimed is:

1. A calibration method, suitable for calibrating a light transceiver module and comprising:
    disposing a plurality of reflective regions, a plurality of light-absorbing regions and a feature region beside the light transceiver module, wherein the reflective regions and the light-absorbing regions are alternately arranged, the feature region is a region for reflection or a region for absorbing light, wherein when the feature region is the region for reflection, a width of the region for reflection is different from a width of each of the reflective regions, and when the feature region is the region for absorbing light, a width of the region for absorbing light is different from a width of each of the light-absorbing regions;
    making the light transceiver module emit light toward the reflective regions, the light-absorbing regions and the feature region and sensing images of the reflective regions, the light-absorbing regions and the feature region; and
    comparing actual orientations of the reflective regions, the light-absorbing regions and the feature region with positions of images formed by the reflective regions, the light-absorbing regions and the feature region on an image sensing surface of the light transceiver module so as to calibrate the actual orientations corresponding to the positions on the image sensing surface.

2. The calibration method as claimed in claim 1, wherein the step of comparing the actual orientations of the reflective regions, the light-absorbing regions and the feature region with the positions of images formed by the reflective regions, the light-absorbing regions and the feature region on the image sensing surface of the light transceiver module so as to calibrate the actual orientations corresponding to the positions on the image sensing surface comprises:

recognizing a feature image portion of the image formed on the image sensing surface corresponding to the feature region;

mapping the position of a first specific point within the feature image portion on the image sensing surface with an actual reference angle corresponding to the feature region;

recognizing a plurality of light-absorbing image portions of the image foamed on the image sensing surface corresponding to the light-absorbing image portions; and respectively mapping the positions of a plurality of second specific points within the light-absorbing image portions on the image sensing surface with a plurality of first actual angles respectively corresponding to the light-absorbing regions.

3. The calibration method as claimed in claim 2, wherein the step of comparing actual orientations of the reflective regions, the light-absorbing regions and the feature region with positions of images formed by the reflective regions, the light-absorbing regions and the feature region on an image sensing surface of the light transceiver module so as to calibrate the actual orientations corresponding to the positions on the image sensing surface further comprises:

storing a first mapping relation between the position of the first specific point on the image sensing surface and the actual reference angle in a control panel electrically connected to the light transceiver module; and storing a second mapping relation between the positions of the second specific points on the image sensing surface and the first actual angles in the control panel.

4. The calibration method as claimed in claim 1, wherein except that the two light-absorbing regions adjacent to the feature region are separated from each other by a first interval, the light-absorbing units are equidistantly arranged respectively by a second interval.

5. The calibration method as claimed in claim 4, wherein the step of recognizing the feature image portion of the image formed on the image sensing surface corresponding to the feature region further comprises:

calculating a plurality of image intervals of the light-absorbing image portions in the image corresponding to the light-absorbing regions;

calculating an average value of the image intervals; and taking a portion of the image corresponding to the one greater than the average value among the image intervals as the feature image portion.

6. The calibration method as claimed in claim 5, wherein the step of comparing actual orientations of the reflective regions, the light-absorbing regions and the feature region with positions of images formed by the reflective regions, the light-absorbing regions and the feature region on an image sensing surface of the light transceiver module so as to calibrate the actual orientations corresponding to the positions on the image sensing surface further comprises:

storing a first mapping relation between the position of the first specific point on the image sensing surface and the actual reference angle in a control panel electrically connected to the light transceiver module; and storing a second mapping relation between the positions of the second specific points on the image sensing surface and the first actual angles in the control panel.

7. The calibration method as claimed in claim 5, further comprising:

after calibrating the actual orientations corresponding to the positions on the image sensing surface, disposing the light transceiver module beside a touch surface;

using the light transceiver module to detect a plurality of light-absorbing points of a plurality of known positions on the touch surface; and comparing the known positions of the light-absorbing points with imaging positions of the light-absorbing points on the image sensing surface of the light transceiver module so as to calibrate relationship between the light transceiver module and the touch surface.

8. The calibration method as claimed in claim 2, further comprising:

using an interpolation approach to calculate a plurality of second actual angles corresponding to the rest positions on the image sensing surface according to the first mapping relation and the second mapping relation, wherein the second actual angles are interlaced between the first actual angles.

9. The calibration method as claimed in claim 2, further comprising:

after calibrating the actual orientations corresponding to the positions on the image sensing surface, disposing the light transceiver module beside a touch surface;

using the light transceiver module to detect a plurality of light-absorbing points of a plurality of known positions on the touch surface; and comparing the known positions of the light-absorbing points with imaging positions of the light-absorbing points on the image sensing surface of the light transceiver module so as to calibrate relationship between the light transceiver module and the touch surface.

10. The calibration method as claimed in claim 9, wherein the light-absorbing points are light-absorbing points on a jig.

11. The calibration method as claimed in claim 9, wherein the light-absorbing points are sequentially formed by an object through sequentially touching the touch surface.

12. The calibration method as claimed in claim 1, wherein the reflective regions are retroreflection regions.

13. The calibration method as claimed in claim 1, further comprising:

after calibrating the actual orientations corresponding to the positions on the image sensing surface, disposing the light transceiver module beside a touch surface;

using the light transceiver module to detect a plurality of light-absorbing points of a plurality of known positions on the touch surface; and comparing the known positions of the light-absorbing points with imaging positions of the light-absorbing points on the image sensing surface of the light transceiver module so as to calibrate relationship between the light transceiver module and the touch surface.

\* \* \* \* \*